(12) United States Patent
Raichle et al.

(10) Patent No.: US 6,861,841 B2
(45) Date of Patent: Mar. 1, 2005

(54) IGNITION WAVEFORM PEAK DISPLAY

(75) Inventors: Kurt Raichle, Owatonna, MN (US); Troy Liebl, Owatonna, MN (US)

(73) Assignee: SPX Corporation, Charlotte, NC (US)

( * ) Notice: Subject to any disclaimer, the term of this patent is extended or adjusted under 35 U.S.C. 154(b) by 131 days.

(21) Appl. No.: 10/305,012

(22) Filed: Nov. 27, 2002

(65) Prior Publication Data
US 2004/0100265 A1 May 27, 2004

(51) Int. Cl.[7] .............................................. F02P 17/00
(52) U.S. Cl. ..................................... 324/379; 324/378
(58) Field of Search ................................ 324/378–380

(56) References Cited

U.S. PATENT DOCUMENTS 4,812,768 A * 3/1989 Quinn ........................ 324/379
6,617,857 B1 * 9/2003 Franz et al. ................ 324/379

* cited by examiner

Primary Examiner—Vincent Q. Nguyen

(57) ABSTRACT

A method and apparatus is provided that can accurately display the data from an ignition event. Data from a secondary waveform of the ignition event is collected and stored. The same data can be averaged and sent to a display buffer. A portion of the previously stored data can be retrieved and replace the peak portion of the waveform that has been averaged, thereby displaying a more accurate peak data.

20 Claims, 4 Drawing Sheets

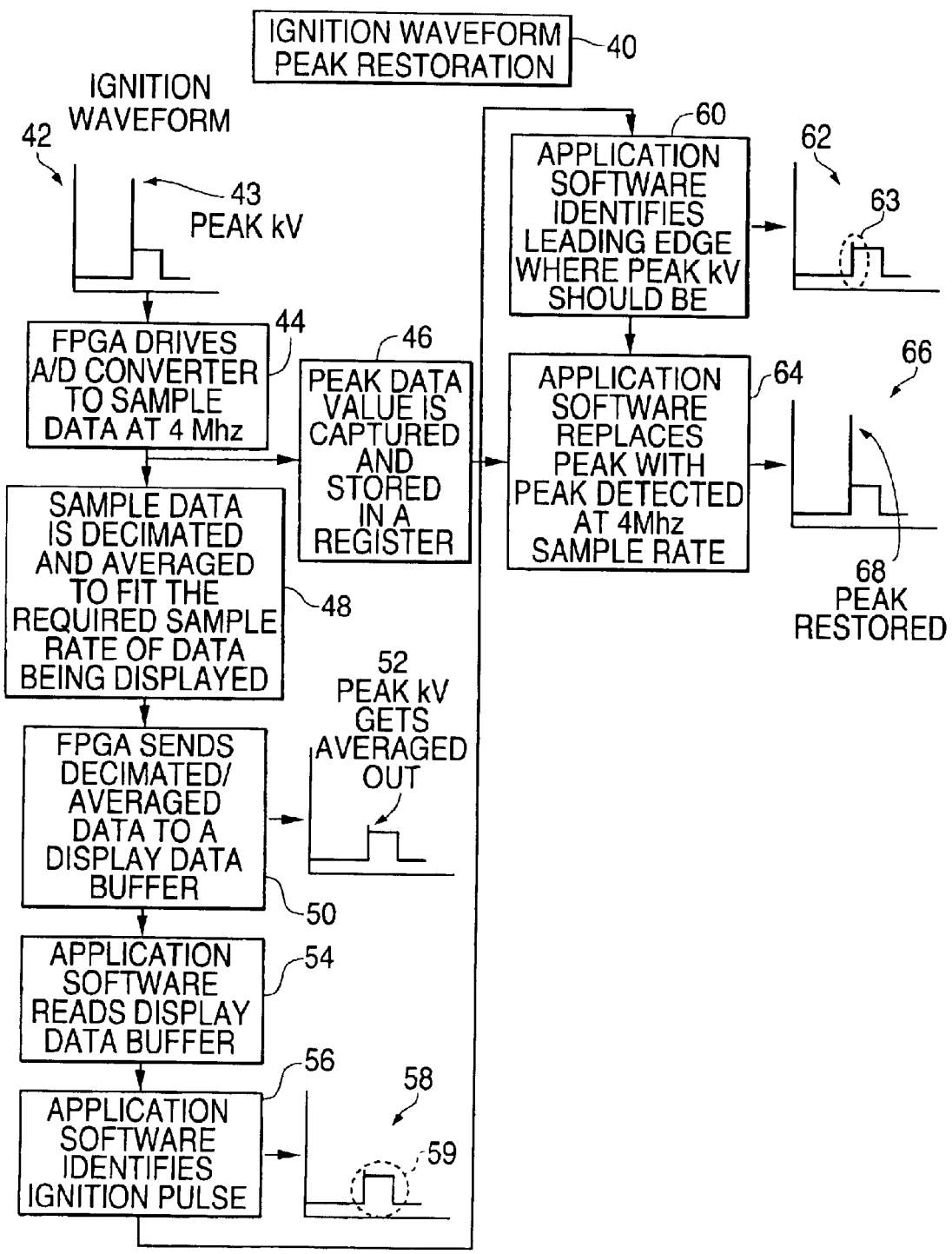

IGNITION WAVEFORM PEAK DISPLAY

FIELD OF THE INVENTION

Embodiments of the present invention generally relate to an apparatus and method for analysis of engines. More particularly, the present invention relates to an apparatus and method to display the peak voltage of an ignition waveform.

BACKGROUND OF THE INVENTION

Conventional combustion, reciprocating engines are widely used as automotive engines. A conventional engine (single-cycle, two-cycle and others) is typically composed of an engine or cylinder assembly having one or more cylinders therein. A piston is slidably disposed in the cylinder and moves reciprocally within the cylinder. A cylinder head at one end of the cylinder completes the cylinder assembly. The cylinder head typically contains the valves (intake and exhaust) and the spark plug. The spark plug typically ignites a pre-mixed fuel that is injected by the intake valve into a combustion chamber and helps to define an ignition event.

Should an ignition event not occur or the cylinder misfires, it can reduce the power output of the engine, can cause low fuel economy and poor performance. Additionally, if the misfire of the cylinder continues for an extended period of time, the cylinder and/or the engine may be permanently damaged. Engine analyzers are used to analyze the performance of internal combustion engines. Engine tests can include tests, such as ignition events of a cylinder, detection of rotation-per-minute fluctuations of engine input, exhaust pipe temperature changes, relative temperature differences among the exhaust ports, rotational torque variations, exhaust pressure pulsing, and abnormal content of exhaust gases.

A conventional digital analyzer can convert analog signals to digital signals for display on an oscilloscope. The oscilloscope can display snapshots of discrete portions of the signals as waveforms. In the case of multiple cylinders, waveforms showing the primary and the secondary ignition voltages are displayed on the analyzer. The voltages are acquired from a primary and a secondary lead that are connected to an ignition coil. A synch probe may be attached to the first cylinder so that the analyzer can identify the cylinders (by knowing where in the sequence the first cylinder is) and determine the firing order of the cylinders. The analyzer can display sweeps, such as an engine sweep or a fixed time sweep. Engine sweeps can display a single cylinder ignition event or a complete cycle of ignition events. Additionally, the engine sweep may be displayed as cylinder, parade, or raster view. Cylinder sweep displays only a single cylinder waveform while the parade and raster display all the cylinders but in a horizontal progression or stacked vertically on top of one another, respectively. The fixed time sweep displays a fixed period of time in which the data is to be collected and shown as determined by a user.

In secondary ignition voltage, the voltage displayed from an ignition pulse typically has a spike portion, a square portion and a residual energy portion. The data from the spike portion can occur rapidly and conventional analyzer do not show the real data spike, rather an average of the spike, thus can provide an operator with false data. With false data, the operator can incorrectly diagnose or miss the misfire of a cylinder, thereby delaying the repairs and increasing costs to the consumer.

Therefore, there is a need for an apparatus and a method to display the data of an ignition event more accurately.

SUMMARY OF THE INVENTION

Embodiments of the present invention generally provide for an apparatus and method to allow the analyzer to collect the correct data from an ignition event. An analyzer is provided that can capture data, including the true data from a spike in a waveform of a secondary ignition event and correctly display the data.

In one embodiment, the analyzing apparatus has a data capture for capturing a first set of data including a true peak data from a sensor of an ignition event. A data converter is provided to convert a first set of data including the true peak data to a second set of data. A data replacer is provided to replace the converted true peak data with the true peak data. A display displays the resulting data.

In an alternate embodiment of the invention, a method of displaying accurate data includes the steps of capturing a set of data having a true peak data from an ignition event of a cylinder; storing the set of data in a memory medium; averaging the set of data including the true peak data to fit a sampling rate; and replacing the averaged true peak data with the true peak data.

In another embodiment of the invention, a system for displaying accurate data from an ignition event includes a means for capturing a first set of data from a sensor that senses signals from an ignition event; a means for storing the first set of data; a means for changing the first set of data into a second set of data; a means for replacing a second peak data from the second set of data with a first peak data from the first set of data; and a means for displaying the replaced data.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 4 illustrates a flow chart of an embodiment of the invention that restores true ignition peak waveform.

DETAILED DESCRIPTION OF THE PREFERRED EMBODIMENT

Figure 1:
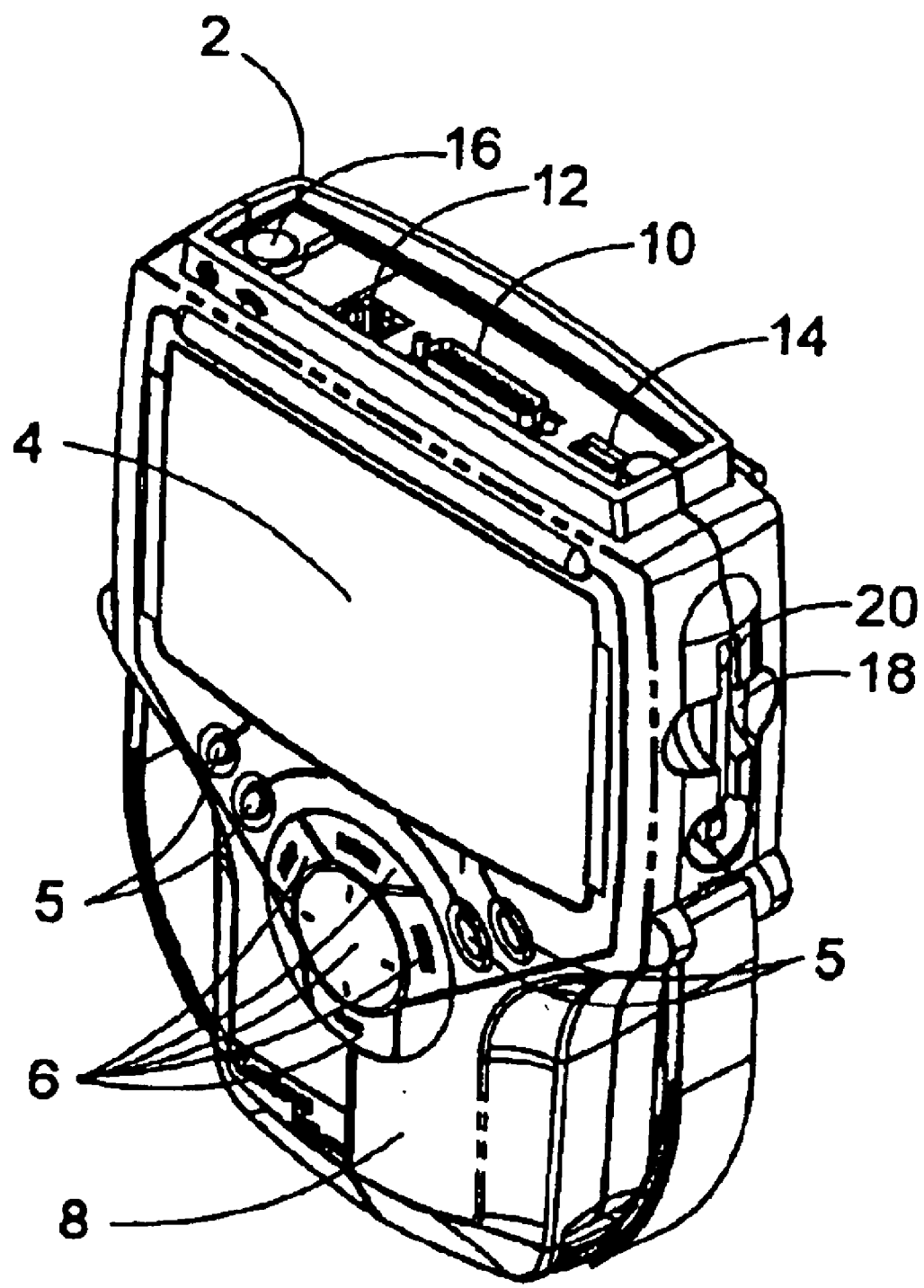
FIG. 1 is an illustration of an analyzer.

FIG. 1 is an illustration of an analyzer. The analyzer can have an oscilloscope or a graphing multimeter. The analyzer can also be connected to another device described below. In one embodiment of the invention, the analyzer can be a handheld interface unit 2, which has a display panel 4, a first button group 5, a second button group 6, a FPGA (Field Programmable Gate Array) (not shown) and/or a processor in communication with a memory medium (not shown) and an A/D (analog to digital) converter. The handheld interface unit 2 is designed to provide a large display for ease of viewing, while providing a handle portion 8 that allows a user to grip the unit securely. The first button group 5 allows the bottom zone of the display to be assigned as needed. There is at least one button, and preferable a row of four or more "soft keys" for changeable user interface options. The second button group 6 provides a set of switch closures independent of screen status, and serves as a primary user interface to the analyzer. There is at least one button in the second button group 6, but there can as many buttons as needed for group 6.

The use of the FPGA allows a designer to make changes to the operations and parameters of the interface unit 2 without having to replace the processor. Changes to a mounted conventional processor requires remounting and reconfiguration of the interface unit 2 design, which in turn requires more design hours and additional costs. With the use of the FPGA, the designer is allowed to make changes on the fly without remounting or tireless reconfiguration of the initial design. The FPGA can collect data from the A/D that converts data from a sensor, such as a secondary ignition lead. The lead collects analog data from the ignition event and the A/D converts the analog data into digital data for display on the interface unit 2.

Upon start-up or boot-up of the interface unit 2, an image of a soft-core microprocessor is loaded from the memory medium (i.e. flash, RAM, etc.) into the FPGA. Therefore, there is an image of the FPGA that resides in the memory medium. Additionally, any new tests or operating parameters that is required by the operator can be easily uploaded into the FPGA and executed. The FPGA is configured and arranged to operate as a conventional processor or with a conventional processor. The FPGA controls and processes a number of different functions of the interface unit 2. One such function is the operation of the capturing data from a sensor, such as a lead. The lead can be a secondary lead that collects secondary ignition data during an ignition event. Another function can include executing an algorithm or an application software (discussed in FIG. 4 below) that is downloaded and stored in a memory medium.

Additional components of the interface unit 2 shown in FIG. 1 include a first custom interface connector 10 for an OBD (On Board Diagnostic) adapter, a serial port connector 12, a USB (Universal Serial Bus) port connector 14, an Infrared Data Association (IrDA)/Hewlett-Packard (HP) Infrared connection 16, a PCMCIA connector 18 and a smart card connector 20. The serial port connector 12, the USB port connector 14 and the Infrared Data Association (IrDA)/Hewlett-Packard (HP) Infrared connection 16, allows communication between the interface unit 2 and other devices. The devices can be connected via a wire through the serial port connector 12 or the USB port connector 14. The devices can also communicate wireless through the IrDA connection 16.

The devices that can communicate with the interface unit 2 can include a gas analyzer, an ignition event analyzer, a battery tester, (other testers) and other testers. The interface unit 2 is shown as an example of the analyzer that can be used in the invention. The interface unit 2 can take electrical data (signals) or any other data and convert them to useful information, such as a waveform, on the display. As the waveforms trace across the screen, the screen displays the signal's characteristics for the operator to review.

Figure 2:
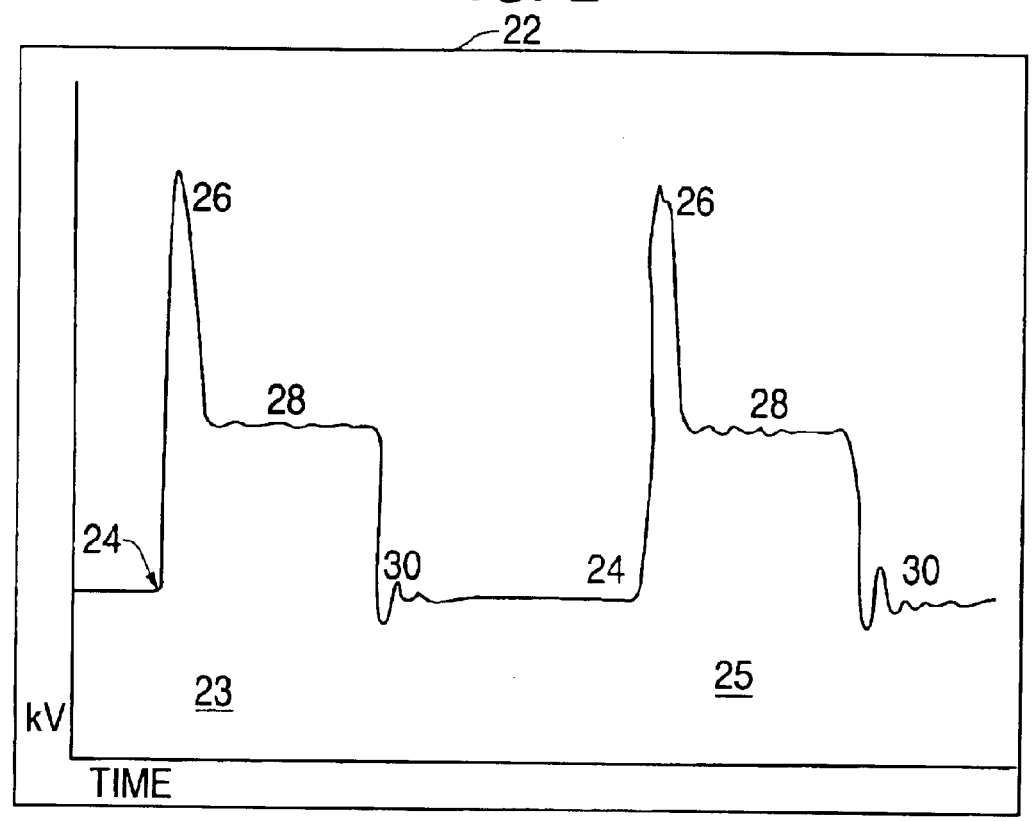
FIG. 2 illustrates two secondary waveforms from an ignition event of a first and second cylinder of an engine FIG. 3 displays a more detailed of the peak amplitude.

In a cylinder of an engine, air/fuel ratio problems can be caused by shorted or leaking injectors, which in turn can cause the cylinder to misfire or not fire at all. Additionally, shorts in the spark plug or fouled spark plug can also cause the cylinder to misfire. The operator can use the interface unit 2 to analyze which cylinder(s) is misfiring. FIG. 2 illustrates two secondary waveforms 23 and 25 from an ignition event of a first and second cylinder of an engine. The x-axis can represent time (microsecond to second or other time period) and the y-axis can represent voltage (kV to V or other voltages). The ignition pulse can include a spike portion of the waveforms 23 and 25 that begins at starting point 24 and jumps to the peak amplitude 26, then decreases to a square portion 28 and then decreases to a residual energy portion 30. The peak amplitude 26 represents the amount of voltage required to overcome any air gaps in the secondary circuit system. The square portion 28 represents when current flows across the gaps or the spark kV point is established. At this point, nothing occurs in an ignition chamber of a cylinder (piston and cylinder head forms an ignition chamber in a cylinder) until the spark kV point is reached. After the spark kV is achieved, then the voltage drops to the residual energy portion 30, which represents any residual energy that remains after the ignition event.

Depending on the sweep display time or the time in which the operator desires to see a single cylinder or multiple cylinder waveform, the interface will collect data in order to show the desired sweep. In doing so, the data from the peak amplitude 26 may not be collected accurately and the true peak amplitude data may be distorted or averaged into the other peak amplitude data causing a false display by the analyzer.

Figure 3:
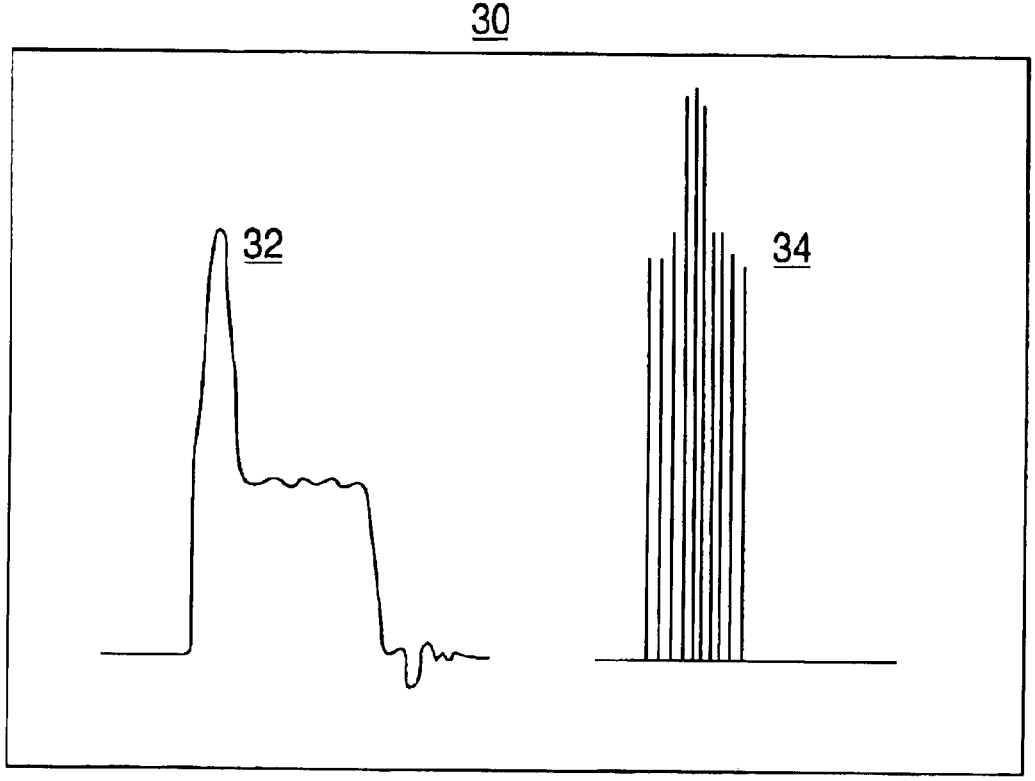

FIG. 3 displays more detailed data of the peak amplitude 32. A display 30 shows the peak amplitude 32 for a secondary waveform that has been averaged and a true peak amplitude data 34 for the same secondary waveform. The true peak amplitude data 34 will have varying amplitudes of the waveform that occurs during the collection of the data. In this case, there is one true peak amplitude that occurs among the ten peak amplitudes 34. A conventional analyzer will only display an average peak amplitude 32 which can provide a false reading for the operator.

FIG. 4 illustrates a flow chart 40 of an embodiment of the invention that restores true ignition peak waveform. An exemplary waveform is shown in graph 42 and includes the true peak kV 43. At step 44, the FPGA can drive an A/D converter to sample data at 4 Mhz. It will be understood by a person skilled in the art that data sampling time or frequency can be used by the operator. At step 46, the peak data value(s) is captured and stored in a register or a memory. The memory can include, but not limited to floppy disc (including ZIP); tape drive cartridge (such as DAT); optical media (such as CD-ROM, DVD-ROM, etc.); flash memory (such as smart media, compact flash, PC card memory, memory sticks, flash SIMMs and DIMMS, etc.); magnetic based media, magneto optical; USB drives; or any other storage media that an operator can store or retrieve information from it. A person skilled in the art will recognize that any storage media can be used. At step 48, the sample data is decimated/averaged to fit the required sample rate of the data being displayed. This can be done with the FPGA or a microprocessor.

At step 50, the FPGA sends the decimated/averaged data to a display data buffer. The decimated/averaged peak kV data can be similar to the waveform shown in graph 52. As shown in graph 52, the peak kV data is not the correct data because the true peak kV have been averaged with other peak kV data, thereby bringing down the true peak kV.

At step 54, an algorithm or application software reads the display data buffer. At step 56, the application software identifies the ignition pulse 59 of the waveform, as shown in graph 58. The application can detect the ignition pulse by looking for characteristics of the ignition pulse 59, such as the square portion. At step 60, after the application software locates the square portion of the ignition pulse or any other portion that the application software recognizes as being part of the ignition pulse, it calculates or identifies the leading edge where the peak kV should be. As shown in graph 62, the application software located the leading edge 63 from the ignition pulse data and identifies where the peak kV should be in the ignition pulse. At step 64, the application software retrieves the previously stored true peak data value(s) from the registry or memory and replaces the peak kV data previously decimated/averaged. Graph 66 displays the peak kV restored 68 by the software application. It should be recognized by a person skilled in the art that the steps outlined above can be done in any order so long as the results show the true peak voltage of the ignition pulse.

With the help of the interface unit 2 and the application software the operator can receive the true peak kV data. By having the true peak kV data, the operator can make a more accurate diagnosis of the cylinders. It will be easier for the operator to identify the misfired cylinder quicker and thus, decreasing the down time of a vehicle that could be used.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An analyzing apparatus, comprising:
    a data capture for capturing a first set of values including a plurality of peak values and a true peak value from a sensor of an ignition event;
    a data converter to convert the first set of values including the true peak value to a second set of averaged peak values, wherein the true peak value is averaged with at least one of the plurality of peak values;
    a data replacer that identifies and replaces the averaged peak value with the true peak value in response to identification of the ignition event; and
    a display for displaying the resulting data.

2. The analyzing apparatus of claim 1, wherein the first set of values is from a secondary waveform of the ignition event.

3. The analyzing apparatus of claim 1, wherein the data capture further converts the first set of values from analog to digital via an analog to digital converter.

4. The analyzing apparatus of claim 1, wherein the first set of values is stored in a memory medium.

5. The analyzing apparatus of claim 4, wherein memory medium is selected from a group consisting of a floppy disc, a tape drive cartridge, an optical media, a flash memory, a magnetic based media, a magneto optical, USB drive, any other storage media that an operator can store or retrieve information from it and a combination thereof.

6. The analyzing apparatus of claim 1, wherein the sensor is a secondary lead.

7. The analyzing apparatus of claim 1, wherein the data capture, the data converter and data replacer is a FPGA (Field Programmable Gate Array) in communication with a signal converter, memory medium and the display.

8. The analyzing apparatus of claim 1, wherein the first set of values comprises an ignition pulse and the associated true peak value.

9. The analyzing apparatus of claim 5, wherein the second set of averaged peak values is the first of values that has been averaged and stored in a data buffer.

10. The analyzing apparatus of claim 9, wherein the data replacer identifies the averaged ignition pulse along with the averaged peak value in the second set of averaged peak values and replaces the averaged peak value with the true peak value.

11. A method of displaying accurate data, comprising:
    capturing a set of data having a true peak data from an ignition event of a cylinder;
    storing the set of data in a memory medium;
    averaging the set of data including the true peak data to fit a sampling rate; and
    replacing the averaged true peak data with the true peak data.

12. The method of displaying of claim 11, wherein capturing the set of data further comprising of converting the set of data from analog to digital data.

13. The method of displaying of claim 11, wherein replacing the averaged true peak data further comprises identifying the averaged true peak data and replacing the averaged true peak data with the true peak data.

14. The method of displaying of claim 11, further comprising displaying the true peak data on a display.

15. The method of displaying of claim 11, wherein the averaged set of data is stored in a display data buffer.

16. A system for displaying accurate data from an ignition event, comprising:
    means for capturing a first set of data from a sensor that senses signals from an ignition event, the first set of data including a first peak data;
    means for storing the first set of data;
    means for changing the first set of data into a second set of data, the second set of data including an averaged peak data and a plurality of averaged ones of the first set of data;
    means for analyzing the second set of data to identify the ignition event;
    means for replacing the averaged peak data with the first peak data in response to the identified ignition event; and
    means for displaying the replaced data.

17. The system of claim 16, wherein the means for capturing is a FPGA in communication with a converter that converts analog signals to digital signals.

18. The system of claim 16, wherein the means for changing averages the first set of data to create the second set of data.

19. The system of claim 16, wherein the storing means is selected from a group consisting of a floppy disc, a tape drive cartridge, an optical media, a flash memory, a magnetic based media, a magneto optical, USB drive, any other storage media that an operator can store or retrieve information from it and a combination thereof.

20. The system of claim 16, wherein the means for replacing identifies where in the second set of data the averaged peak data is and replaces the averaged peak data with the first peak data.

* * * * *